(12) United States Patent
Digiovanni et al.

(10) Patent No.: US 8,520,299 B2
(45) Date of Patent: Aug. 27, 2013

(54) SELECTIVELY PUMPING A GAIN-DOPED REGION OF AN OPTICAL FIBER

(75) Inventors: David J Digiovanni, Mountain Lakes, NJ (US); Siddharth Ramachandran, Pittsburgh, PA (US)

(73) Assignee: OFS Fitec, LLC, Norcross, GA (US)

( * ) Notice: Subject to any disclaimer, the term of this patent is extended or adjusted under 35 U.S.C. 154(b) by 909 days.

(21) Appl. No.: 12/525,124

(22) PCT Filed: Feb. 5, 2008

(86) PCT No.: PCT/US2008/053069
§ 371 (c)(1),
(2), (4) Date: Jul. 30, 2009

(87) PCT Pub. No.: WO2008/097986
PCT Pub. Date: Aug. 14, 2008

(65) Prior Publication Data
US 2010/0103959 A1    Apr. 29, 2010

Related U.S. Application Data (60) Provisional application No. 60/888,114, filed on Feb. 5, 2007.

(51) Int. Cl.
*H01S 3/067* (2006.01)
*H01S 3/094* (2006.01)

(52) U.S. Cl.
CPC ....... *H01S 3/06733* (2013.01); *H01S 3/094096* (2013.01); *H01S 3/0672* (2013.01); *H01S 3/094038* (2013.01); *H01S 3/094003* (2013.01); *H01S 3/06741* (2013.01); *H01S 2301/20* (2013.01)
USPC ...................................... 359/341.3; 385/127

(58) Field of Classification Search
CPC ............ H01S 2301/20; H01S 3/09438; H01S 3/094003; H01S 3/094096; H01S 3/067041; H01S 3/06733; H01S 3/0672
USPC ......... 359/333, 341.3, 341.32; 385/126–128
See application file for complete search history.

(56) References Cited

U.S. PATENT DOCUMENTS

| | | | |
|---|---|---|---|
| 3,790,902 A * | 2/1974 | Miller .................... | 372/49.01 |
| 3,875,422 A * | 4/1975 | Stolen .................... | 359/330 |
| 4,923,279 A * | 5/1990 | Ainslie et al. ............ | 385/127 |
| 4,959,837 A * | 9/1990 | Fevrier et al. ............ | 372/6 |
| 5,638,388 A * | 6/1997 | Nighan et al. ............ | 372/22 |
| 5,880,877 A * | 3/1999 | Fermann et al. ......... | 359/341.31 |
| 6,282,342 B1 * | 8/2001 | Berkey et al. ........... | 385/43 |
| 6,288,835 B1 * | 9/2001 | Nilsson et al. ........... | 359/341.3 |
| 6,373,868 B1 * | 4/2002 | Zhang .................... | 372/19 |
| 6,480,659 B1 * | 11/2002 | Patlakh et al. ........... | 385/125 |

(Continued)

OTHER PUBLICATIONS

Wikipedia contributors. Transverse mode. Wikipedia, The Free Encyclopedia. Feb. 3, 2012, 21:06 UTC. Available at: http://en.wikipedia.org/w/index.php?title=Transverse_mode&oldid=474851622. Accessed Feb. 27, 2012.*

*Primary Examiner* — Mark Hellner
*Assistant Examiner* — Ari M Diacou
(74) *Attorney, Agent, or Firm* — Sam Han, Esq.

(57) ABSTRACT

The present disclosure provides an approach to more efficiently amplify signals by matching either the gain materials or the pump profile with the signal profile for a higher-order mode (HOM) signal. By doing so, more efficient energy extraction is achieved.

15 Claims, 9 Drawing Sheets

(56) References Cited

U.S. PATENT DOCUMENTS

| | | | |
|---|---|---|---|
| 6,483,974 B1* | 11/2002 | Waarts | 385/123 |
| 6,917,742 B2* | 7/2005 | Po | 385/125 |
| 7,006,751 B2* | 2/2006 | Provost et al. | 385/141 |
| 7,177,510 B2* | 2/2007 | Ramachandran | 385/124 |
| 7,228,029 B1 | 6/2007 | Ramachandran et al. | |
| 7,257,293 B1 | 8/2007 | Fini et al. | |
| 7,272,288 B2 | 9/2007 | DiGiovanni et al. | |
| 7,925,128 B2 | 4/2011 | Ramachandran | |
| 8,000,570 B2 | 8/2011 | Digiovanni et al. | |
| 8,103,142 B2 | 1/2012 | Ramachandran et al. | |
| 2002/0030881 A1* | 3/2002 | Nilsson et al. | 359/341.1 |
| 2002/0126956 A1* | 9/2002 | Bouteiller et al. | 385/37 |
| 2002/0141716 A1* | 10/2002 | Lysiansky et al. | 385/123 |
| 2002/0164140 A1* | 11/2002 | Lysiansky et al. | 385/127 |
| 2002/0186941 A1* | 12/2002 | Hsu et al. | 385/123 |
| 2002/0186944 A1* | 12/2002 | Riant et al. | 385/127 |
| 2002/0186946 A1* | 12/2002 | Dong et al. | 385/127 |
| 2003/0044159 A1* | 3/2003 | Anderson et al. | 385/142 |
| 2004/0052495 A1* | 3/2004 | Englund et al. | 385/141 |
| 2004/0258377 A1* | 12/2004 | Berkey et al. | 385/123 |
| 2005/0169323 A1* | 8/2005 | Spariosu et al. | 372/9 |
| 2006/0098694 A1* | 5/2006 | Hongo | 372/6 |
| 2006/0233554 A1 | 10/2006 | Ramachandran et al. | |
| 2006/0269200 A1* | 11/2006 | DiGiovanni et al. | 385/123 |
| 2007/0206910 A1 | 9/2007 | Ramachandran | |
| 2008/0095199 A1* | 4/2008 | Abramczyk | 372/6 |
| 2010/0008633 A1 | 1/2010 | Digiovanni et al. | |
| 2010/0027938 A1 | 2/2010 | Digiovanni et al. | |

* cited by examiner

SELECTIVELY PUMPING A GAIN-DOPED REGION OF AN OPTICAL FIBER

CROSS REFERENCE TO RELATED APPLICATIONS

This application claims the benefit of U.S. provisional patent application Ser. No. 60/888,114, filed 2007 Feb. 5, having the title "Higher Order Mode Amplifiers," which is incorporated herein by reference in its entirety.

Additionally, the following U.S. patent applications are incorporated by reference herein, as if expressly set forth in their entireties:

(a) U.S. patent application Ser. No. 11/606,718; filed on 2006 Nov. 30, by DiGiovanni et al., now issued as U.S. Pat. No. 7,271,288;

(b) U.S. patent application Ser. No. 11/230,905, filed on 2005 Sep. 20, by Nicholson et al., now issued as U.S. Pat. No. 7,228,029;

(c) U.S. patent application Ser. No. 11/105,850, filed on 2005 Apr. 14, by Ramachandran et al.;

(d) U.S. patent application Ser. No. 11/367,495, filed on 2006 Mar. 4, by Ramachandran et al.;

(e) U.S. patent application Ser. No. 11/487,258, filed on 2006 Jul. 14, by Fini et al., now issued as U.S. Pat. No. 7,257,293.

Also, the following U.S. patent applications, which are being filed concurrently, are incorporated by reference herein, as if set forth in their entireties:

(f) U.S. Pat. No. 8,103,142, by Ramachandran and Yablon, issued on 2012 Jan. 24, having the title "Preventing Dielectric Breakdown in Optical Fibers";

(g) U.S. Pat. No. 8,000,570, by DiGiovanni and Ramachandran, issued on 2011 Aug. 16, having the title "Sequentially Increasing Effective Area in Higher-Order Mode (HOM) Signal. Propagation";

(h) U.S. Pat. No. 7,925,128, by Ramachandran, issued on 2011 Apr. 12, having the title "Pumping in a Higher-Order Mode that is Different From a Signal Mode";

(i) U.S. patent application Ser. No. 12/525,122, by DiGiovanni, Ghalmi, Mermelstein, and Ramachandran, filed on 2009 Jul. 30, having the title "Segmented Gain-Doping of an Optical Fiber"; and (j) PCT/08/53071, filed on 2008 Feb. 5, which was assigned U.S. patent application Ser. No. 12/525,138, filed on 2009 Jul. 30, by DiGiovanni and Headly, having the title "Pumping in a Higher-Order Mode that is Substantially Identical to a Signal Mode."

FIELD OF THE DISCLOSURE

The present disclosure relates generally to optical fibers and, more particularly, to higher-order mode ("HOM") signal transmission in optical fibers.

BACKGROUND

Ever since silica-based optical fibers have been used for high-power lasers and amplifiers, there have been ongoing efforts to increase the power of the signal that is transmitted through the fibers, and also to improve energy efficiency during signal amplification.

In conventional laser pumping, energy is transferred from an external source to a gain-doped fiber (or other laser gain medium). That transferred energy is absorbed in the fiber, thereby producing excited states in the atoms within the fiber. At a given point, the number of particles in one excited state exceeds the number of particles in the ground state (or another less-excited state). In this condition, known as population inversion, stimulated emission can occur, and the fiber can act as a laser or an optical amplifier. Thus, when a signal is injected into the fiber, the pump energy is transferred from the gain medium to the injected signal, thereby amplifying the injected signal as it propagates along the fiber.

Efforts have been made to alter the profile for the injected signal. However, what has not been extensively studied is the effect of shaping the pump.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION OF THE EMBODIMENTS

Reference is now made in detail to the description of the embodiments as illustrated in the drawings. While several embodiments are described in connection with these drawings, there is no intent to limit the disclosure to the embodiment or embodiments disclosed herein. On the contrary, the intent is to cover all alternatives, modifications, and equivalents.

As noted above, in conventional laser pumping, energy is transferred from an external source to a gain-doped fiber, thereby producing excited states in the atoms within the fiber. When population inversion is achieved, stimulated emission can occur, and the fiber can act as a laser or an optical amplifier. Thus, when a signal is injected into the fiber, the pump energy is transferred from the gain medium to the injected signal, thereby amplifying the injected signal as it propagates along the fiber.

Rare-earth-doped amplifiers (e.g., those doped by Erbium (Er) or Ytterbium (Yb)), which produce high-power signals at around the 1.5-micrometer wavelength, are often cladding pumped, meaning that the pump is introduced into the cladding, which is not gain-doped. The pump light in the cladding, through various known reflective and refractive mechanisms, eventually enters the gain-doped region of the optical fiber, thereby resulting in population inversion in the gain-doped region.

Unfortunately, for fibers that have a very small gain-doped cross-sectional area as compared to the cladding region, which is not gain-doped, the pump absorption length becomes large. The increase in absorption length results in lower excitation levels and, also, a compromised power efficiency.

Figure 1A:
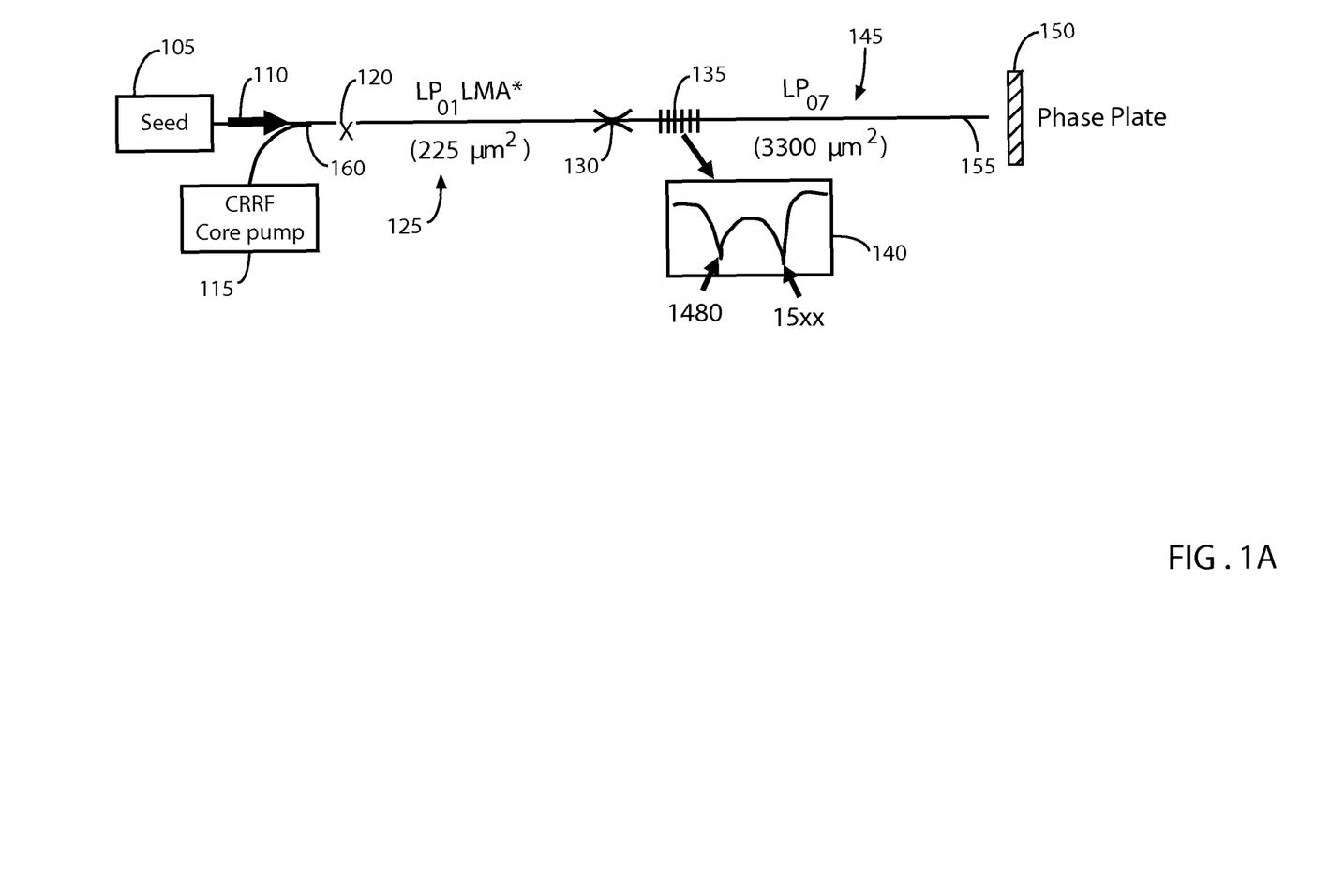
FIG. 1A is a schematic showing an example setup for converting both a pump and a signal to a higher-order mode (HOM).
Figure 1B:
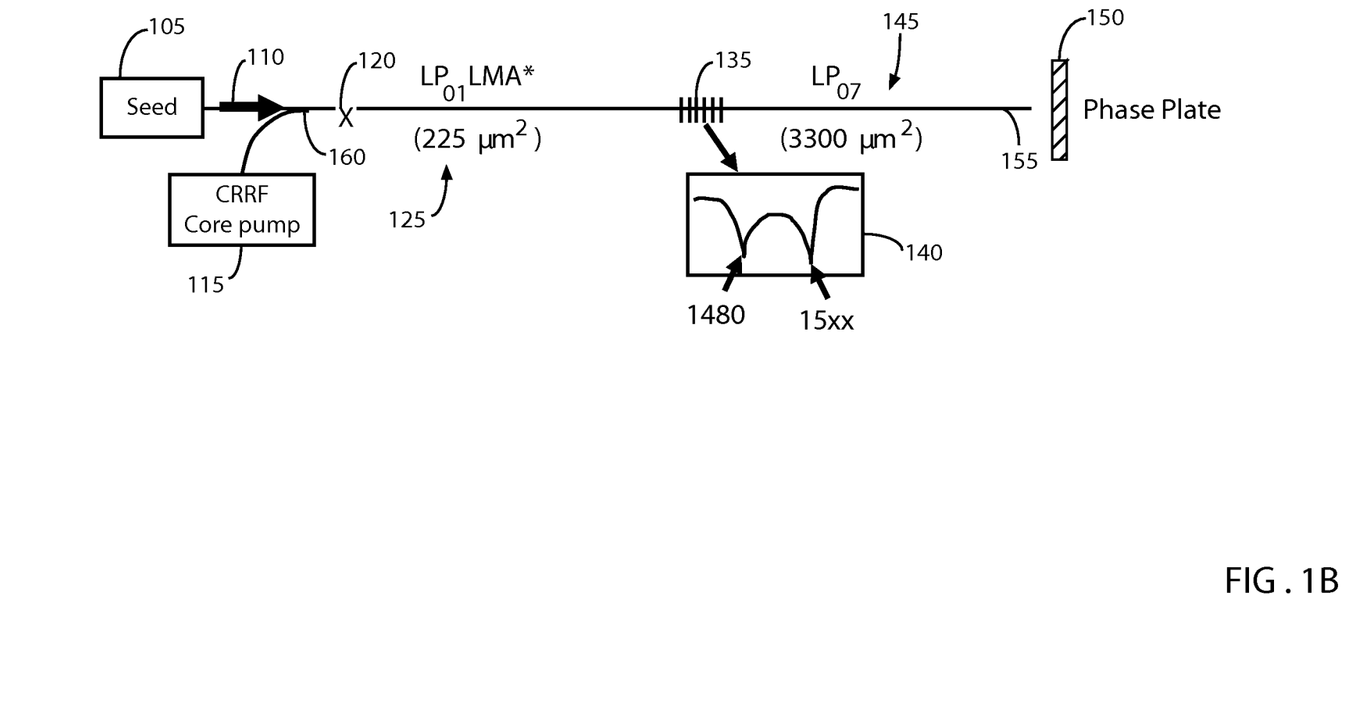
FIG. 1B is a schematic showing another example setup for converting both a pump and a signal to a HOM.
Figure 2A:
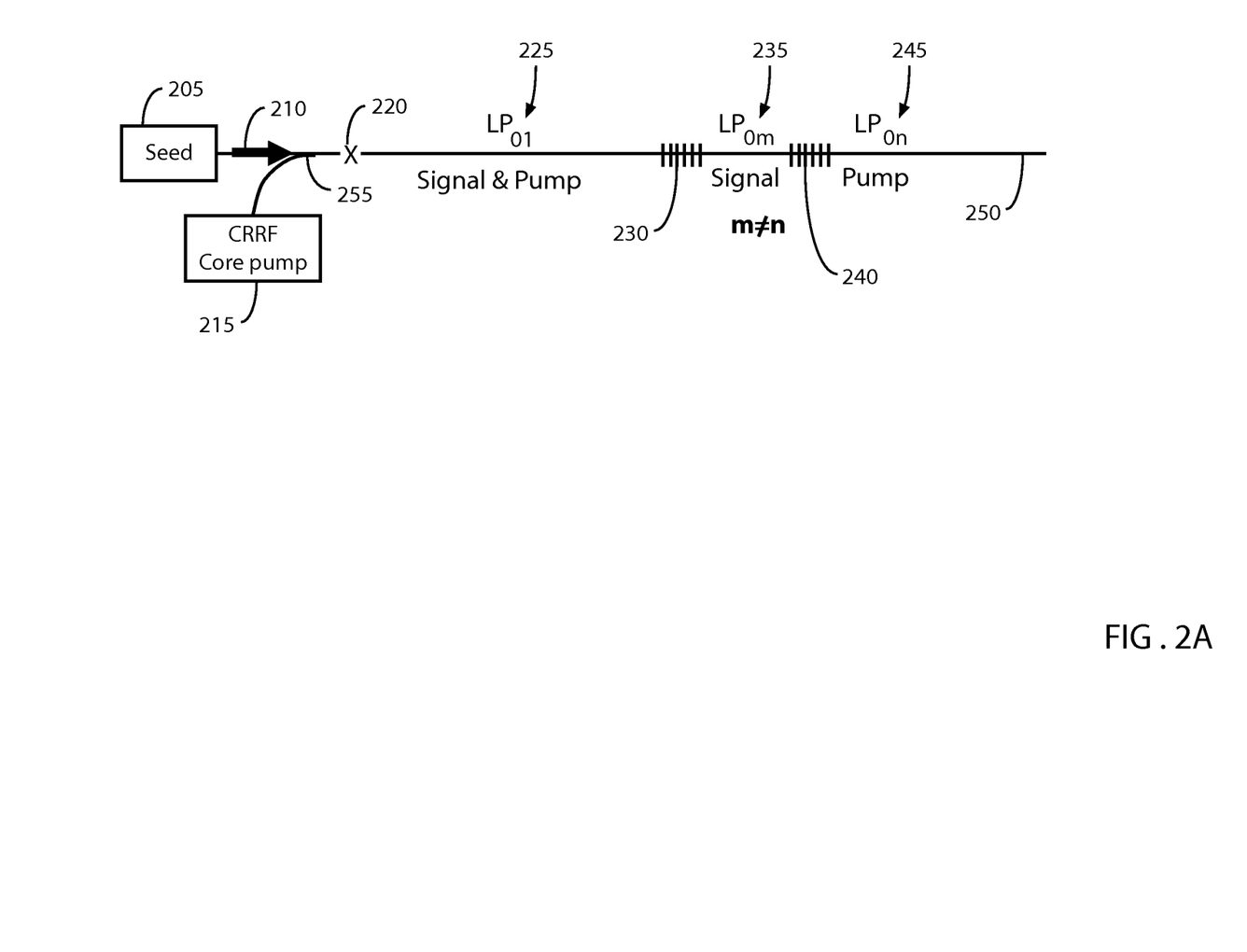
FIG. 2A is a schematic showing a third example setup for converting both a pump and a signal to a HOM.
Figure 2B:
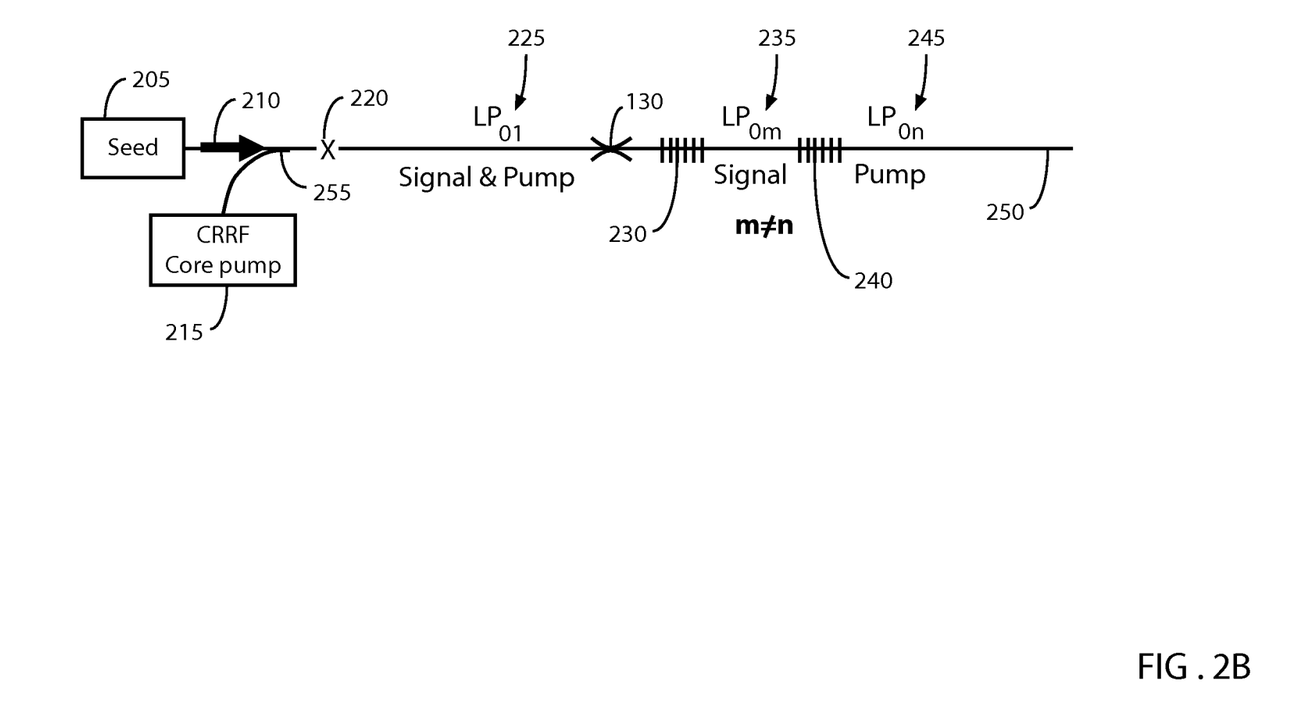
FIG. 2B is a schematic showing a fourth example setup for converting both a pump and a signal to a HOM.

To remedy this problem, it is desirable to pump the core (or other gain-doped region), rather than the cladding, which is typically not gain-doped. However, suitable pump diodes, which can directly couple into the gain-doped region, do not have sufficient power. In some embodiments of the invention, as shown in FIGS. 1 and 2 herein, a cascaded Raman resonator (CRR) is used to pump the core (or other gain-doped region). It should be appreciated that the invention is not limited to the use of CRR. Rather, other fiber lasers can be used to pump the gain-doped region of the optical fiber.

Also shown in FIGS. 1A, 1B, 2A, and 2B are various approaches to further increase the conversion efficiency by suitably tailoring the pump to match the spatial intensity profile of the signal that is being amplified. By matching the spatial intensity profile of the pump to the spatial intensity profile of the signal, more effective energy extraction is achieved. The reason being that, when the pump energy is not transferred to the signal, this results in amplified spontaneous emissions (ASE), which, as is known in the art, is an undesired effect.

Referring now to the diagrams, FIG. 1A shows an example architecture for converting both a pump and a signal to a higher-order mode (HOM). In particular, FIG. 1A shows an embodiment using a cascaded Raman resonator (CRR) 115 as the pump source. The pump is multiplexed with the signal 110 at an input fiber 160 and the multiplexed light is launched into a gain-doped fiber 155, which is spliced 120 to the input fiber 160. Since the CRR 115 pumps the gain-doped region at the launch end, rather than pumping the outer cladding (which is not gain-doped), this configuration increases power efficiency, compared to conventional cladding pumping, by confining the pump light to the gain-doped area where the energy conversion occurs.

Figure 3:
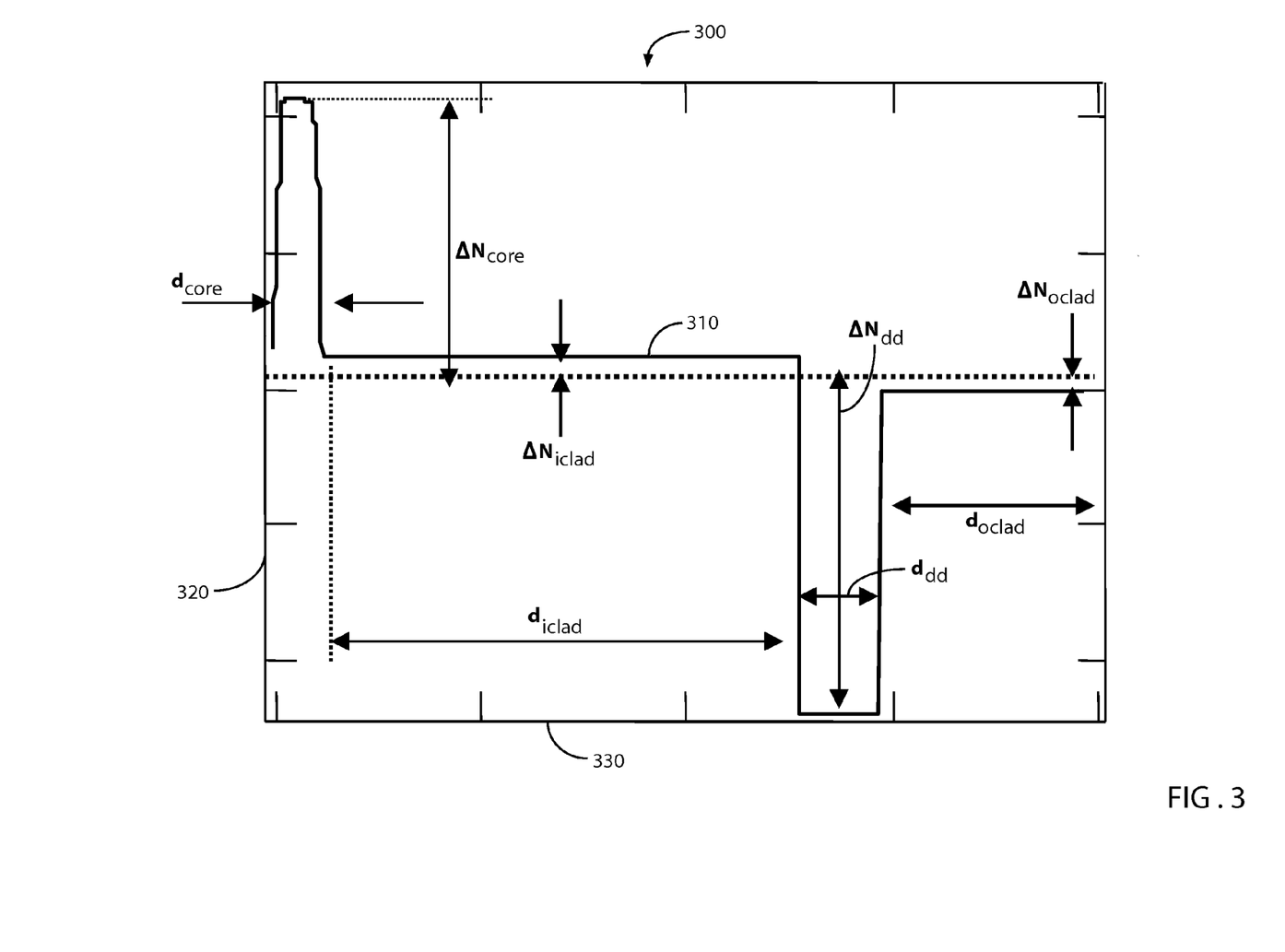
FIG. 3 is a chart showing an example index profile of an optical fiber.

In FIG. 1A, a mode converter 135, such as a long-period grating (LPG), is placed some distance along the gain fiber 155, allowing the signal to be amplified in the fundamental $LP_{01}$ mode 125 before conversion to a higher-order mode (HOM) signal. The gain fiber 155 has a profile similar to that shown in FIG. 3. Since one having ordinary skill in the art is familiar with these index profiles, FIG. 3 is not discussed in great detail herein. Suffice it to say that, in the embodiment of FIG. 1A, the core ($d_{core}$) and the inner cladding ($d_{iclad}$) are both gain-doped so that signals traveling through core and the inner cladding will be amplified.

Continuing with FIG. 1A, the mode converter 135 can be designed to have multiple peaks in conversion efficiency, thereby accommodating both the pump wavelength and the signal wavelength. Due to the high extinction of mode converters, light that is not resonant with the mode converter 135 will pass through the converter 135 with little attenuation or distortion.

While peaks are shown for wavelengths of 1480 and a range between 1500-1600 (shown here as 15xx), it should be appreciated that the mode converter 135 can be designed to accommodate virtually any wavelength combinations. Since mode converters can be designed and fabricated with wideband operation, especially when operating at the turn-around point (TAP), if the pump and the signal wavelengths are within the conversion bandwidth, then both the signal and the pump will be converted to the same HOM as the light 145 continues to propagate down the gain-fiber 155.

Figure 7A:
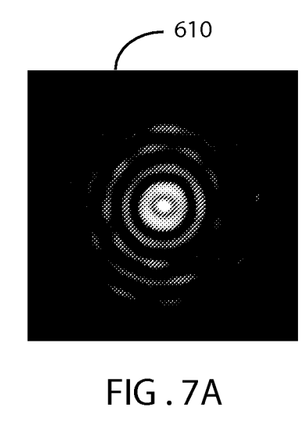
FIG. 7A is a diagram showing a near-field image of an example HOM signal.
Figure 7B:
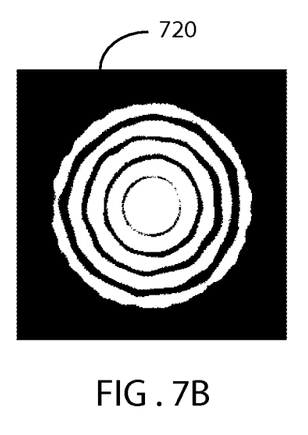
FIG. 7B is a diagram showing the pumped region that corresponds to the HOM signal of FIG. 7A.

FIGS. 7A and 7B are diagrams showing near-field images of an example signal 610 and pump 720, respectively, which have both been converted to a HOM such that the intensity profile of the pump 720 substantially overlaps with the intensity profile of the signal 610. While FIGS. 7A and 7B show the HOM being the $LP_{06}$ mode, it should be appreciated that the pump and signal can be converted to other HOMs as desired or needed. Since, as shown in FIGS. 7A and 7B, the $LP_{06}$ pump 720 now overlaps with the $LP_{06}$ signal 610, the pump energy is more efficiently converted and there is less likelihood of ASE from the "dark" regions.

In other embodiments, multiple converters can be used to separately convert the pump and the signal. Also, for other embodiments, the signal and the pump need not be converted to the same HOM. Rather, the signal may be converted to one HOM while the pump is converted to another HOM. FIG. 2A shows one embodiment in which the signal and the pump are converted to different HOMs, using two separate, serially-placed mode converters.

The architecture, as shown in FIG. 2A, comprises a signal source 205 that launches the signal 210 and a CRR 215 for the pump. The signal 210 and the pump are multiplexed onto an input fiber 255, which is spliced 220 to a gain-doped fiber 250. Similar to the embodiment described with reference to FIG. 1A, the gain-doped fiber of FIG. 2A has a gain-doped core and a gain-doped inner cladding.

Figure 6A:
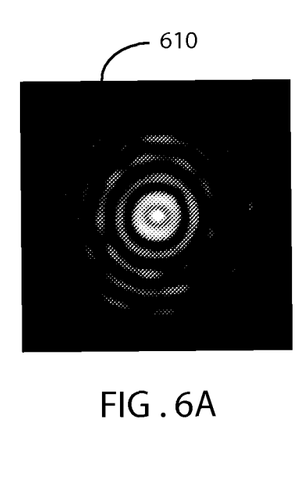
FIG. 6A is a diagram showing a near-field image of an example HOM signal.
Figure 6B:
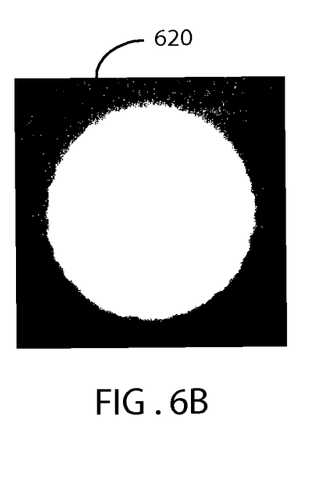
FIG. 6B is a diagram showing the pumped region that corresponds to the HOM signal of FIG. 6A.

The multiplexed $LP_{01}$ light 225 travels some distance along the fiber 250, thereby allowing the signal to be amplified in the fundamental $LP_{01}$ mode. At some point, a signal mode converter converts the signal to $LP_{0m}$ mode 235, while passing the pump with little-to-no distortion or attenuation. FIGS. 6A and 6B show a specific example where m=6. Upon passing through the signal mode converter 230, the resulting $LP_{06}$ signal will appear similar to that shown in FIG. 6A while the pump, which passes through the signal mode converter 230 without conversion, appears similar to that shown in FIG. 6B.

Subsequent to passing through the signal mode converter 230, the HOM signal 610 and the pump 620 pass through a pump mode converter 240, which is specifically configured to affect only the pump wavelength. As such, the HOM signal 610 passes through the pump mode converter with little-to-no distortion or attenuation, while the $LP_{01}$ pump gets converted to a HOM. The converted light 245, which now includes the HOM signal and the HOM pump, continues to propagate down the gain fiber 250.

While the signal mode converter 230 and the pump mode converter 240 are shown in FIG. 2A as being located serially along the gain fiber 250, it should be appreciated that, if the mode converters are constructed of LPGs or other comparable structures, the mode converters 230, 240 may be written at the same physical location in the gain fiber 250. Alternatively, the serial order of the mode converters can be rearranged without detrimental effect on the operation of the apparatus. Also, as shown in the embodiment of FIG. 2A, the HOM of the pump (n) need not be the same as the HOM of the signal (m).

Reasons exist for converting the signal and the pump to different HOMs (i.e., m≠n). For example, the pump mode converter 240 could be a wide-band converter constructed near the grating TAP to accommodate uncertainty or drift in pump wavelength or wavelength-multiplexing of several pumps. The signal mode converter 230 may be a narrow-band device to filter unwanted wavelength components. For this particular circumstance, it may be desirable to have the pump mode (n) be different from the signal mode (m).

Returning to the embodiment of FIG. 1A, to improve mode extinction, unwanted modes from splices and scattering can be stripped by strategically placing an optional HOM mode stripper 130 prior to the mode converter 135. Another embodiment without the HOM mode stripper 130 is shown as FIG. 1B. Since the architecture of FIG. 1A is substantially similar to the architecture of FIG. 1B, with the exception of the mode stripper 130, a description of any duplicative items is omitted herein.

Continuing, the mode stripper 130, which is shown in FIG. 1A, can be fabricated as a short length of fiber, over which the coating is removed and the fiber is tapered or etched to cause light in the cladding to be stripped away. As such, only the light that is guided by the central core (which includes both the pump and signal) will be retained. In other words, the mode stripper 130 removes (or strips away) various undesired HOMs that may be present in the system, and the mode stripper 130 in combination with the mode converter 135 fulfills all filtering functions except that of in-band ASE in the same mode.

For example, light may reside in any number of HOMs that propagate backward (or counter to the signal). These unwanted HOMs can result from ASE, or stimulated Brllouin scattering (SBS) arising in the HOM gain fiber 155, or reflected light. Such backward propagating light will not be resonant with the mode converter 135 and will remain in the cladding, to be removed by the mode stripper 130.

Forward-propagating HOM light may originate at splices or from scattering in or before the segment on the signal-side of the mode stripper 130. The mode stripper 130 will also remove this forward-propagating HOM light.

Additionally, any ASE generated in the desired HOM, but out-of-band with the mode converter 135 will also not convert to the fundamental mode. As such, this out-of-band HOM will also be removed.

Also, backward-propagating in-band ASE that is generated in the $LP_{01}$ fundamental mode of the HOM section will convert to $LP_{07}$ and will also be removed by the mode stripper 130.

In short, the mode stripper 130 will remove all but the in-band HOM and the out-of-band fundamental mode. The in-band ASE, however, is typically not a problem. Also, the out-of-band fundamental mode may not be problematic because the pump profile will, by definition, match that of the signal. As such, much of the problematic portions of the light will be removed by the mode stripper 130, and any light that remains unaffected by the mode stripper 130 will likely be benign.

Given the functionality of the mode stripper 130 in FIG. 1A, similar improvements can be achieved in the embodiment of FIG. 2A by strategically placing an optional HOM mode stripper 130 prior to the mode converter 230. Such an embodiment, which includes the HOM mode stripper 130, is shown in FIG. 2B. Since the remaining architecture of FIG. 2B is substantially similar to the architecture of FIG. 2A, further discussion of other similar components in FIG. 2B is omitted here.

Figure 4A:
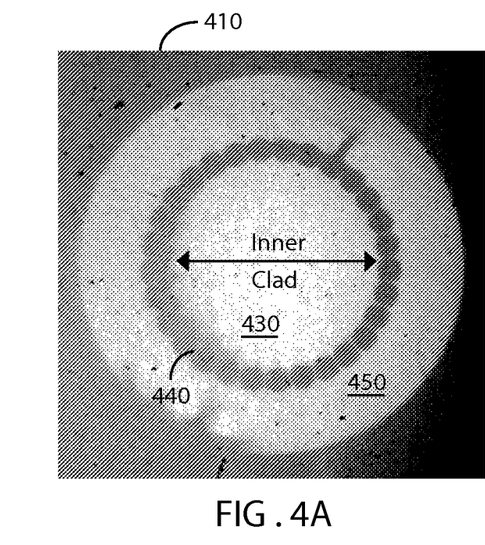
FIG. 4A is a diagram showing a near-field image of a cross-section of an optical fiber.
Figure 4B:
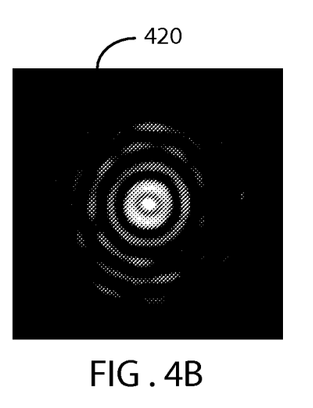
FIG. 4B is a diagram showing a near-field image of an example signal that is transmitted along the fiber of FIG. 4A.

Since the CRR 115, 215 pumps the core (or other smaller-diameter gain-doped region), it is worthwhile to examine the structure of the gain-doped fiber in greater detail. FIG. 4A is a diagram showing a near-field image of a cross-section of an optical fiber, and FIG. 4B is a diagram showing a near-field image of an example signal that is transmitted along the fiber of FIG. 4A.

As background, conventional double-clad amplifiers, including HOM amplifiers, are cladding pumped. These cladding-pumped amplifiers include a region that guides the signal (typically a core, which is gain-doped) and a region that guides the pump light (typically a cladding, which is not gain-doped). The cross-sectional area of the cladding is normally much greater than the cross-sectional area of the core. This difference in area accommodates low-brightness pumps that are used for high-power operation, which means that the rate of absorption of pump light is reduced by an amount that is roughly proportional to the ratio of the two areas. This results in a corresponding increase in the fiber length.

Unfortunately, for high power amplifiers, this increase in length concomitantly increases the amount of undesired length-dependent nonlinear effects. For this reason, it is desirable to guide the pump in the same spatial region as the signal to increase the overlap.

In conventional large-mode area (LMA) fibers with low-brightness pumps, this is typically not possible because the core has a relatively low numerical aperture (NA) to reduce the number of guided modes and maintain a large mode area. In such designs, the pump guide (e.g., cladding) has different characteristics, and therefore must be in a different spatial region that the signal guide (e.g., core).

For HOM propagation, this need not be so. Because the mode is robustly guided and resistant to mode coupling, and because it can be excited with high extinction, the NA of the guide can be large. In fact, the pump guide and the HOM guide can be in the same region. Turning to the drawings, FIG. 4A shows a cross-sectional image 410 of a fiber (or waveguide) that can propagate HOM signals. The fiber comprises a central core (not visible in the image 410) and an inner cladding 430 that surrounds the core. Radially-exterior to the inner cladding 430 is a ring of air holes 440, which, in turn, is surrounded by a silica ring 450. While not shown, a polymer layer surrounds the entire structure. The refractive index profile of such a fiber is shown in FIG. 3.

The inner cladding 430 is supported by a thin silica web, which defines the air holes. The thickness of the web is small enough to effectively confine the light to the inner cladding 430 and prevent leakage of light to the silica ring 450. Due to the large contrast in index between air and silica (shown as $\Delta N_{dd}$ in FIG. 3), the inner cladding 430 is a high NA guide (approximately 0.6 to 0.8), suitable for containing pump light.

Moreover, since the NA can be significantly higher than conventional double-clad fiber, which is constructed of low-index polymer rather than air holes, the light-carrying capacity of the fiber in FIG. 4A is equivalent to a fiber that is about 50% larger in diameter. For some HOM designs, the pump guide can be pumped using free-space optics.

FIG. 4B shows a near-field image 420 of an example HOM signal that is transmitted along the fiber of FIG. 4A. In particular, the scale of FIG. 4B is matched to the scale of FIG. 4A to show the correspondence between the diameter of the outer-most ring on the $LP_{06}$ HOM signal and the diameter of the inner cladding 430. Given this correspondence, one can see that the inner cladding 430, when gain-doped, is suitable for guiding HOMs. As such, the pump and the signal can have high spatial overlap and be guided by the same gain-doped region 430 (core and inner cladding). In other words, the same waveguide confines both the signal and pump, even though the signal and pump may reside in different spatial modes.

Continuing with FIG. 4B, the intensity pattern on the HOM image 420 exhibits slight modulation due to the shape of the perimeter of the inner cladding 430. In conventional double-clad fibers, significant effort is expended to create a noncircular pump waveguide or induce mode distortion within the pump waveguide to more effectively couple pump light to the smaller gain (or core) region. Unlike conventional double-clad fibers, in FIG. 4A, the pump and signal are co-located, and, hence, the pump waveguide can be circular and undistorted.

For other embodiments, noncircular inner claddings can be configured. For example, rectangular inner claddings can be used, due to their improved heat-transfer characteristics over thin dimensions.

It is worthwhile to note that, while air-clad fibers are specifically shown in FIG. 4A, the core-pumping concept can be extended to polymer-clad fibers and glass-clad fibers. For some embodiments that have a very deep trench ($\Delta N_{dd}$ of FIG. 3 is very large), the trench area ($d_{dd}$ of FIG. 3) can be enlarged. As a consequence, the outer region ($d_{oclad}$ of FIG. 3) can be eliminated altogether.

As noted above, the embodiments of FIGS. 1 and 2 show various approaches to matching the intensity profile of the signal with the intensity profile of the pump. By matching the intensity profiles, ASE from the "dark" regions can be reduced. Another alternative to reducing the ASE in these so-called "dark" regions is by selectively doping the gain-doped fiber so that the fiber regions that correspond to the "dark" regions of the signal will have no gain dopant. This is described in greater detail with reference to FIGS. 5A and 5B.

Figure 5A:
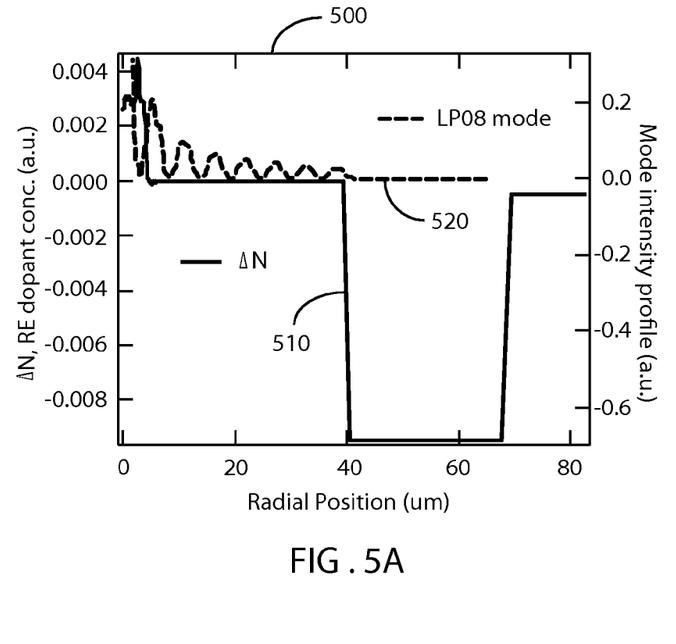
FIG. 5A is a chart showing an index profile of an optical fiber and a corresponding HOM signal that can be transmitted along the optical fiber.

FIG. 5A is a chart 500 showing an index profile 510 of an optical fiber and a corresponding HOM signal 520 that can be transmitted along the optical fiber. As shown in FIG. 5A, an $LP_{08}$ HOM signal 520 is carried along an inner cladding, which, in this particular embodiment, extends radially outward to approximately 40 micrometers. The "dark" regions correspond to the zero intensities on the HOM signal 520 plot.

Figure 5B:
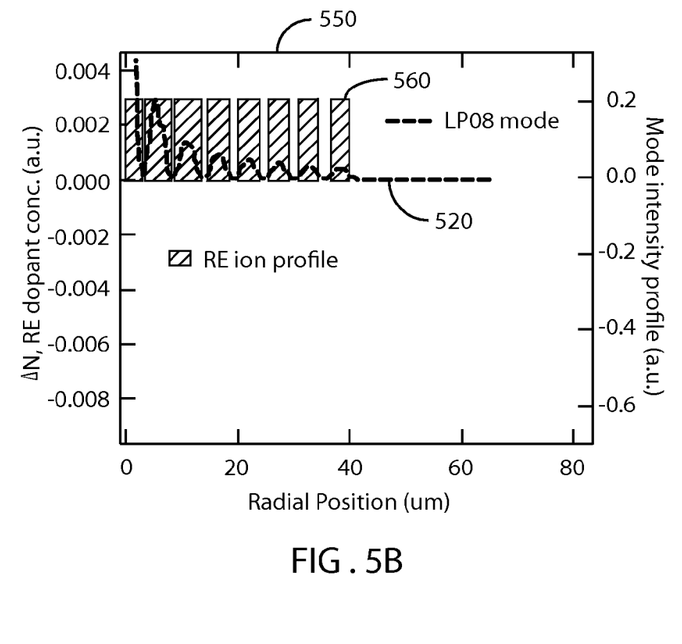
FIG. 5B is a chart showing a signal profile of a HOM signal and a corresponding fiber-gain-doping profile.

FIG. 5B is a chart showing the HOM signal 520 of FIG. 5A and a corresponding fiber-gain-doping profile 560. As one can see, the fiber is doped with rare-earth (RE) dopants at distinct radial locations. Specifically, the location of the gain-dopants corresponds to each intensity peak of the $LP_{08}$ HOM signal 520. Thus, unlike conventional gain-doped fibers, which largely have a uniform distribution of RE-dopants within the entire inner cladding, the embodiment of FIG. 5B shows segmented doping of the fiber to correspond with the particular HOM signal that will be transmitted along that particular fiber.

One disadvantage of segmented doping, as compared to simply converting the pump to a HOM, is a reduced flexibility in mode selection. Once a fiber has been gain-doped in specific regions, the intensity profile of the signal cannot be changed without destroying the signal's spatial correspondence with the gain-doped fiber profile. Additionally, any anomalous doping can result in imperfect overlap of the gain-doped region and the HOM signal. For this reason, it may be preferable to employ the approaches taught with reference to FIGS. 1 and 2, rather than the segmented-doping approach of FIGS. 5A and 5B.

Although exemplary embodiments have been shown and described, it will be clear to those of ordinary skill in the art that a number of changes, modifications, or alterations to the disclosure as described may be made. For example, while specific HOMs have been shown in the drawings and described in detail, it should be appreciated that other mode orders (in addition to those that are expressly shown) can be used to accommodate various other design parameters. Additionally, while specific examples of doping profiles have been shown and described, it should be appreciated that these specific doping profiles may be altered to correspond, in varying degrees, to different HOM signals. All such changes, modifications, and alterations should therefore be seen as within the scope of the disclosure.

What is claimed is:

1. A system comprising:
   (A) an optical fiber comprising:
      (A1) a gain-doped region for guiding a higher-order mode, comprising:
         (A1a) a core having a first index of refraction, the core being rare-earth (RE) doped: and
         (A1b) an inner cladding located radially exterior to the core, the inner cladding having a second index of refraction, the second index of refraction being less than the first index of refraction, the inner cladding being RE doped; and
      (A2) a trench located radially exterior to the inner cladding, the trench comprising air holes, the trench having a third index of refraction, the third index of refraction being less than the second index of refraction;
   (B) a signal source optically coupled to the optical fiber, the signal source for launching a signal into the gain-doped region of the optical fiber; and
   (C) a cascaded Raman resonator (CRR) optically coupled to the optical fiber, the CRR for directly pumping the gain-doped region of the optical fiber.

2. A system comprising:
   an optical fiber having a gain-doped region, the gain-doped region being a waveguide for a higher-order mode (HOM), the gain-doped region comprising a gain-doped core having a first index of refraction, the gain-doped region further comprising a gain-doped inner cladding having a second index of refraction, the second index of refraction being less than the first index of refraction;
   a signal source optically coupled to the gain-doped region of the optical fiber, the signal source for launching a signal into the gain-doped region of the optical fiber; and
   a pump source optically coupled to the gain-doped region, the pump source for directly pumping the gain-doped region of the optical fiber.

3. The system of claim 2, the pump source being a cascaded Raman resonator.

4. The system of claim 2, the gain-doped region comprising a rare-earth (RE) dopant.

5. The system of claim 4, the rare-earth (RE) dopant comprising Erbium.

6. The system of claim 4, the rare-earth (RE) dopant comprising Ytterbium.

7. The system of claim 2, the optical fiber comprising:
   a trench located radially exterior to the gain-doped region, the trench having an index of refraction that is lower than an index of refraction of the gain-doped region.

8. The system of claim 7, the trench comprising air.

9. The system of claim 2, the optical fiber comprising a trench located radially exterior to the gain-doped region, the trench having a third index of refraction, the third index of refraction being less than the second index of refraction.

10. The system of claim 9, the trench comprising air.

11. The system of claim 9, the trench comprising a silica web.

12. In an optical fiber having a gain-doped region, the gain-doped region being a waveguide for a higher-order mode (HOM), a method comprising:
    launching a signal into the gain doped region, the gain-doped region comprising a gain-doped core having a first index of refraction, the gain-doped region further comprising a gain-doped inner cladding having a second index of refraction, the second index of refraction being less than the first index of refraction; and
    directly pumping the gain-doped region.

13. The method of claim 12, wherein the step of pumping the gain-doped region comprises the step of launching light at a pump wavelength, the light being launched by a fiber laser.

14. The method of claim 13, wherein the fiber laser is a cascaded Raman resonator (CRR).

15. An optical fiber, comprising:
    a gain-doped region for guiding a higher-order mode (HOM) signal, the HOM signal having intensity peaks, the gain-doped region being directly pumped by a pump source, the gain-doped region comprising:
        a core having a first index of refraction; and
        an inner cladding having a second index of refraction, the second index of refraction being less than the first index of refraction;
    segmented doping regions within the gain-doped region, the segmented doping regions corresponding to the intensity peaks; and
    a trench located radially exterior to the gain-doped region, the trench having a third index of refraction, the third index of refraction being less than the second index of refraction.

* * * * *